United States Patent [19]
Shelstad

[11] 4,164,053
[45] Aug. 14, 1979

[54] VEHICLE WASHING APPARATUS

[76] Inventor: Richard J. Shelstad, 12711 N. Woodberry Dr., Mequon, Wis. 53092

[21] Appl. No.: 460,347

[22] Filed: Apr. 12, 1974

[51] Int. Cl.² .............................................. B60S 3/04
[52] U.S. Cl. ...................... 15/97 B; 15/DIG. 2
[58] Field of Search ......................... 15/DIG. 2, 97 R

[56] References Cited

U.S. PATENT DOCUMENTS

| 3,683,441 | 8/1972 | Fromme | 15/97 R |
|---|---|---|---|
| 3,765,043 | 10/1973 | Lesser | 15/97 R |
| 3,859,686 | 1/1975 | Breish | 15/97 R |
| 3,862,460 | 1/1975 | Rockafellow | 15/97 R |

*Primary Examiner*—Edward L. Roberts
*Attorney, Agent, or Firm*—Michael, Best & Friedrich

[57] ABSTRACT

A vehicle washing apparatus, particularly effective for scrubbing the upper portions of a vehicle as it moves along a predetermined path through a wash bay or the like, including an overhead carriage extending transversely of the vehicle path and a plurality of curtain or sheets of flexible, felt-like material extending in facing relation below the upper portions of the vehicle. The lower portions of the sheet include a plurality of vertical slits forming a plurality of narrow ribbons or strips. The carriage is reciprocated or oscillated through an arcuate path about a horizontal axis extending transversely of the vehicle. This oscillatory movement of the carriage imparts both a fore and aft and up and down movement on the strips with respect to the vehicle, providing a circulatory-like scrubbing action on the upper portions of the vehicle.

13 Claims, 3 Drawing Figures

VEHICLE WASHING APPARATUS

BACKGROUND OF THE INVENTION

This invention relates to vehicle washing apparatus and, more particularly, to apparatus for scrubbing the upper portions of a vehicle as it moves along a predetermined path through a wash bay.

Many conventional automatic vehicle washing devices employs some means for scrubbing the upper portions of the vehicle as it moves along a predetermined path through a wash bay. For example, a horizontally extending rotary brush which engages the top portions of the vehicle and one or more large stationary curtains which drape over and drag along the upper surfaces of the vehicle have been used for this purpose. These devices are not completely satisfactory because a thorough scrubbing is not provided on certain areas of the vehicle, such as the hood, front and rear windows, the trunk, and horizontally extending side window ledges. U.S. Pat. No. 3,157,405 describes a device using a plurality of ribboned curtains which are reciprocated back and forth across the vehicle. Although this device is capable of providing reasonably good scrubbing of some portions of the vehicle, it is not capable of providing completely satisfactory scrubbing for other area, particularly the front end, the rear portion of squareback vehicles, such as station wagons, panel trucks, etc. and the top surfaces of horizontally extending side window ledges.

SUMMARY OF THE INVENTION

A primary object of this invention is to provide a vehicle washing apparatus which is capable of thoroughly scrubbing the upper portions of the vehicle as it moves along a predetermined path through a wash bay or the like.

Another object of the invention is to provide such an apparatus which is capable of thoroughly scrubbing the upper portions of the square-back vehicles, such as station wagons and the like.

Other objects and advantages of the invention will become apparent upon reviewing the following detailed description, the drawings, and the appended claims.

The vehicle washing apparatus provided by this invention includes a carriage means located above the vehicle and mounted for arcuate movement about a generally horizontal axis extending transversely of the vehicle travel path, at least one curtain of relatively flexible, felt-like sheet material suspended from the carriage means and extending in facing relation below the upper portions of the vehicle, and drive means for oscillating the carrier means about its pivot axis. This oscillatory movement of the carriage means swings the curtain or curtains back and forth with respect to the vehicle in a direction generally parallel to the vehicle path. The resulting fore and aft and up and down movement imparted to the lower portion of the curtain provides a superior scrubbing action on the front end, the hood, the front and back windows and the rear end of the vehicle, particularly the rear portions of square-back vehicles and the top surfaces of horizontally extending side window ledges.

Preferably, each curtain is made from the sheet of felt-like material and in the lower portion includes a plurality of laterally spaced vertical slits forming relatively narrow ribbons or strips. As the curtains are swung back and forth by the oscillating carriage assembly, the flat faces of these narrow ribbons or strips slide along the surfaces of the vehicle.

DESCRIPTION OF THE PREFERRED EMBODIMENTS

Figure 1:
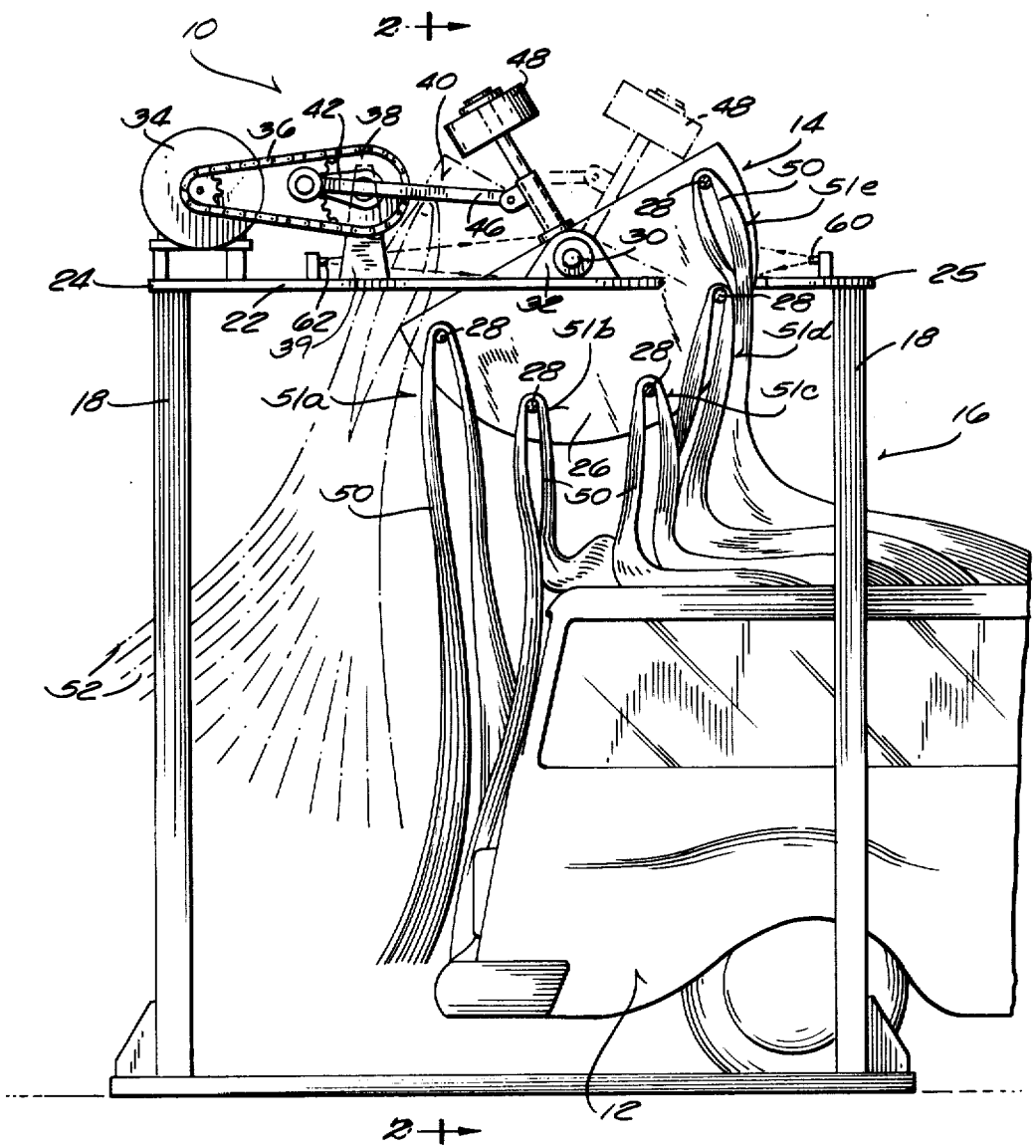
FIG. 1 is a side elevation view of a vehicle. washing apparatus embodying various of the features of the invention, shown scrubbing the rear portion of a station wagon.
Figure 2:
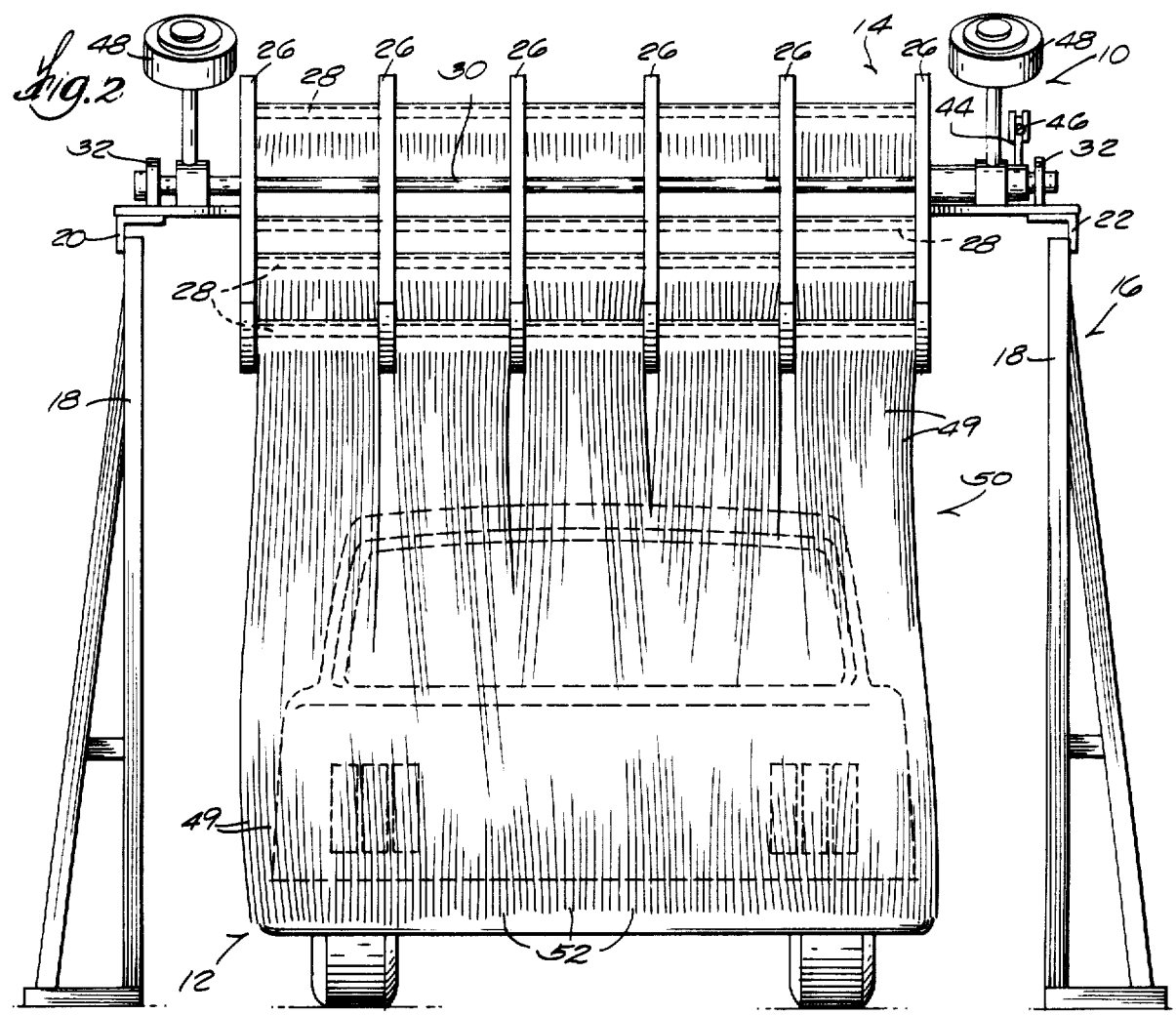
FIG. 2 is a front view of the apparatus shown in FIG. 1 taken along the line designated 2—2 in FIG. 1.

Illustrated in the drawings is a car washing apparatus 10 for scrubbing the upper portions of a vehicle 12, such as a station wagon, as it travels along a predetermined path through a wash bay. The vehicle is moved by a conventional conveyor means or driven through the bay in the usual manner.

Figure 3:
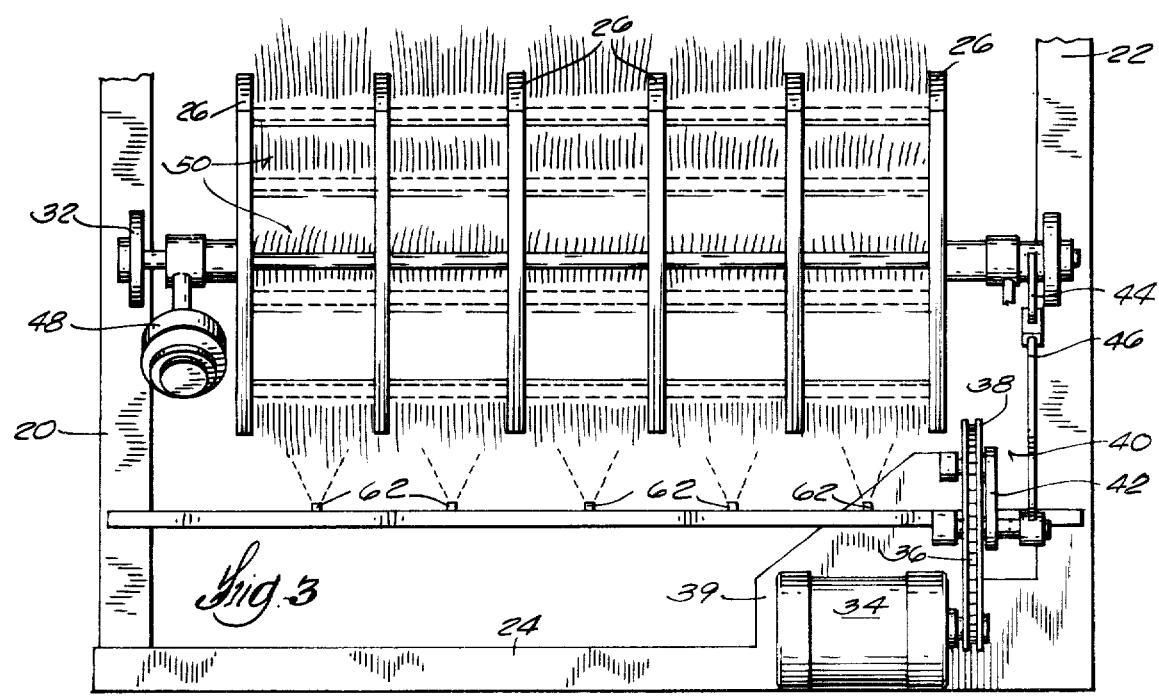
FIG. 3 is a fragmentary top view of the apparatus shown in FIG. 1.

The car washing apparatus 10 includes an overhead carriage assembly 14 which is pivotally supported on a stationary support structure 16 above the height of the vehicle 12 and extends across the vehicle travel path. The support structure 16 includes two opposed pairs of vertical uprights 18 which are located on the opposite sides of the wash bay and are mounted on the floor, as shown in FIGS. 1 and 3, or suspended from a ceiling. Mounted on the uprights 18 is a horizontal frame having side members 20, 22 and cross members 24, 25.

The carriage assembly 14 includes a plurality of laterally spaced, vertically extending frame or plate members 26, a plurality of horizontally extending support rods or arms 28 affixed to each plate member 26 and a horizontally extending rod 30 located to serve as a horizontal pivot axis or axle for the carriage assembly 14. The opposite ends of the rod 30 extend beyond the outermost plate members 26 and are suitably journaled in pillow blocks 32 mounted on cross members 20 and 22.

In order to provide the desired scrubbing action described in more detail below, drive means are provided for reciprocating or oscillating the carriage assembly 14 through an arcuate path about the horizontal pivot axis defined by the rod 30. While various arrangements can be used, in the specific construction illustrated, such drive means includes a hydraulic motor 34 which is mounted on the cross member 24 and, through a chain 36, drives a sprocket 38 rotatably supported on a bracket 39 extending from the cross member 24. The sprocket 38 in turn drives the carriage assembly 14 through a crank arrangement 40 including a crank arm 42 fixably connected to the sprocket 38 or to a shaft driven by the sprocket 38, a drive arm 44 fixably connected to the carriage pivot rod 30 and a connecting link 46 pivotally connected at the opposite ends to the crank arm 42 and the drive arm 44. To facilitate the oscillatory movement of the carriage assembly 14, counterweights 48 can be mounted on the opposite end portions of the rod 30 as shown.

The carriage assembly 14 is located at an elevation to provide clearance for the tallest vehicle to be washed. In order to reduce the amount of overhead space required, the plate members 26 are preferably generally semicircularly shaped, as shown in FIG. 1, so that the clearance between the carriage assembly 14 and the vehicle 12 remains substantially constant throughout the arcuate travel of the carriage assembly 14.

Suspended from each support arm 28 between adjacent pairs of plate members 26 and in facing relation to the vehicle 12 is a curtain 50 which extends below the upper portions of the vehicle and serves to scrub the top portions of the vehicle as it travels past the oscillating carriage assembly 14. The curtains 50 preferably extend substantially below the top surfaces of the hood and the trunk. Each of the curtains 50 is made from a relatively flexible, reasonably absorbent, felt-like, sheet material which will not scratch the vehicle paint. For example, various synthetic plastic carpeting materials, such as polyproplyene and a material sold under the trademark "Ozite", are particularly advantageous because of their light weight and long wear characteristics.

All except the upper portion of each curtain 50 includes a plurality of vertical slits 49 forming the lower portion of the curtain into narrow, flat ribbons or strips 52. In order to provide the thorough scrubbing action, the strips 52 are preferably about one inch wide and are several feet in length. Although a single layer of material can be used, each curtain 50 preferably is double length and hangs at a center fold from a support arm 28 as best shown in FIG. 1. In this case, only a central portion of the curtain is not ribboned. Each of the curtains 50 is secured in place on the respective support arm 28 in a suitable manner.

The outermost curtains 50 preferably extend laterally some distance between the outer extremities of the vehicle so that a more thorough scrubbing is provided on the upper side portions of the vehicle, particularly the horizontally extending side window ledges on some vehicles. For example, the distance between the outermost plate members 26 can be about 6 feet with the spacing between the plate members 26 being about 2 feet.

The support arms 28 preferably are spaced apart with respect to the direction of vehicle travel so that the curtains 50 hang in spaced rows 51a, 51b, 51c, 51d, and 51e and provide multiple scrubbing of the vehicle as it advances past the carriage assembly. As shown in FIG. 1, in which the carriage assembly have been broken away to clarify illustration, the support arms 28 are preferably arranged in a semicircular pattern with respect to the carriage pivot axis and most preferably are circumferentially spaced at equal distances from each other. If desired, the support arms 28 can be affixed to the periphery of the plate members 26. With this arrangement, the curtains 50 are moved through an arcuate path about the pivot axis 30 during oscillation of the carriage assembly 14, resulting in both an up and down and a fore and aft movement being imparted to the strips 52. The arcuate movement of the carriage assembly 14 preferably is large enough to provide some angular movement of the strips 52 relative to the top surfaces of the vehicle. As a guide, a total arcuate travel of about 90° (i.e., 45° clockwise and 45° counterclockwise from a normal horizontal starting position as viewed in FIG. 1) generally is adequate.

While the curtains for the different rows can extend to the same elevation, all the curtains preferably are the same length so that rows 51a, 51b, and 51c are progressively at lower elevations with respect to the direction of vehicle travel and rows 51c, 51d and 51e are progressively at higher elevations with respect to the direction of vehicle travel.

A washing solution, such as hot, soapy water, can be continuously sprayed onto the strips 52 during oscillatory movement of the carriage assembly 14 by two sets of spray nozzles 60 and 62 located adjacent to the opposite sides of the carriage assembly 14. As shown in FIG. 1, one set of nozzles 60 directs hot, soapy water onto one surface of the strips 52 while the other set of nozzles 62 simultaneously directs hot, soapy water, through the open top of the carriage assembly 14, onto the opposite surface of the strips 52. Thus, both of the flat scrubbing surfaces of the strips 52 can be thoroughly wetted with the hot soapy water throughout the scrubbing operation.

In operation, as the vehicle 12 advances along its path, the strips 52 of the first row 51a of curtains 50 engage the front end of the vehicle before it reaches the location of the carriage assembly. Because of the combined fore and aft and up and down motion imparted to the strips 52 by the oscillating carriage assembly 14, an up and down scrubbing action is provided, primarily by the flat faces of the strips 52, on the front end of the vehicle. Thus, the front end is thoroughly scrubbed, even though it has an odd shape which is not adequately scrubbed with conventional apparatus.

As the vehicle advances further, some of the strips 52 drape over the sides of the hood while others lie on the top of the hood. The fore and aft and up and down movement imparted to the strips, combined with the drag produced by the forward movement of the vehicle, tends to produce a fore and aft circulatory scrubbing action on the top of the hood and an up and down circulatory scrubbing action on the upper side portions of the front fenders. At the same time the strips 52 of the first row or rows of curtains provide a generally up and down scrubbing action on the windshield and the strips of the last row or rows of curtains continue to provide a generally up and down scrubbing action on the front end.

When the vehicle is advanced to a point where the top is being scrubbed, a similar scrubbing action is provided on the sides and top of the vehicle. That is, strips draping over the sides of the vehicles provide an up and down circulatory scrubbing action on the upper side portions of the vehicle, including the side windows, and strips lying on the top of the vehicle provide a fore and aft circulatory scrubbing action on the top. For vehicles having horizontally projecting side window ledges, a fore and aft scrubbing action is provided on the top surfaces thereof by the strips draping over the sides. In FIG. 1 the strips draping over the passenger side of the vehicle 12 have been omitted for the purpose of clarity.

As the vehicle advances further, the first rows of curtains become draped over the rear of the vehicle as shown in FIG. 1 and the strips thereof provide an up and down scrubbing thereon. Since the strips are being swung fore and aft by the carriage assembly 14, this scrubbing action on the rear end of the vehicle continues for some time after the vehicle has moved past the location of the carriage assembly.

From the above description, it can be appreciated that the car washing apparatus of this invention is capable of providing an improved scrubbing action on all the upper portions of vehicles having a variety of shapes. Instead of relying solely upon the frictional drag between a curtain and the vehicle or the scrubbing action provided by the edges of transversely reciprocating ribbons, scrubbing is provided primarily by the flat surfaces of the strips and the fore and aft and up and down movement imparted to the strips by the oscillating carriage assembly provides an improved circulatory-like scrubbing action. Furthermore, the total scrubbing time provided is considerably longer than that provided by conventional apparatus.

While multiple rows of curtains provide a more thorough scrubbing, a single row of curtains can be used. Also, the carriage assembly can be arranged to employ a single curtain extending across the width of the vehicle.

As it will be readily apparent to those skilled in art after reading the detailed description of the preferred embodiments of this invention, various modifications and alterations can be made thereto without departing from the spirit and scope of the invention.

I claim:

1. An apparatus for washing a vehicle as it moves along a predetermined travel path comprising
   carriage means located above the height of the vehicle to be washed and extending transversely of and entirely across the width of the vehicle travel path,
   means supporting said carriage means for oscillatory, arcuate movement about a generally horizontal axis extending transversely of the vehicle travel path;
   at least one curtain member of a flexible, felt-like material suspended from a support means carried by said carriage means and having a free end extending below the upper portions of the vehicle and transversely of the vehicle travel path;
   means for wetting the upper portions of the vehicle; and
   drive means for oscillating said carriage means through an arcuate path about said axis to swing said curtain member back and forth relative to the vehicle in a direction generally parallel to the vehicle travel path so that said curtain member scrubs the upper portions of the vehicle as it moves along the travel path.

2. An apparatus according to claim 1 wherein said curtain member is in the form of a sheet including a plurality of laterally spaced slits in the lower portion thereof forming a plurality of narrow strips.

3. An apparatus according to claim 2 wherein said sheet is double length and is suspended at the center from said support means.

4. An apparatus according to claim 2 including a plurality of said support arms mounted on said carriage means in spaced, parallel rows with respect to the direction of vehicle travel and one of said sheets suspended from each of said support arms.

5. An apparatus according to claim 2 wherein said support means includes
   a plurality of vertically extending, transversely spaced plate members, and
   an elongated, generally horizontal support arm extending transversely of the vehicle path and connected to said plate members for carrying each of said sheets.

6. An apparatus according to claim 5 wherein said plate members are generally semicircularly shaped with the curved portions thereof extending toward the vehicle, and
   said support arms are connected to said plate members in a semicircular pattern with respect to said axis and in parallel, spaced relation with respect to the direction of vehicle travel.

7. An apparatus according to claim 6 wherein the lower ends of said strips define an arc similar to the arc of said support arms.

8. An apparatus according to claim 2 wherein said drive means includes
   a crank drive operably connected to said carriage means, and
   a motor drivingly connected to said crank drive for driving said carrier means.

9. An apparatus according to claim 2 wherein said wetting means includes
   a plurality of first spray nozzles located in the vicinity of said carriage means for directing a washing solution onto one surface of said curtain member; and
   a plurality of second spray nozzles located in the vicinity of said carriage means and spaced from said first spray nozzles for simultaneously directing a washing solution onto the opposite surface of said curtain member.

10. An apparatus according to claim 2 wherein the total arcuate travel of said carriage means about said pivot axis is about 90°.

11. An apparatus according to claim 2 wherein each of said sheets has a width greater than the width of the vehicle travel path.

12. An apparatus for washing a vehicle as it moves along a predetermined path comprising
    a carriage means located above the height of the vehicle to be washed and extending transversely of the vehicle travel path
    means supporting said carriage means for arcuate movement about a generally horizontal axis extending transversely of the vehicle travel path;
    a plurality of sheets of a flexible, felt-like material, each of said sheets suspended from a horizontally extending, rigid support arm affixedly mounted on said carriage means in spaced, parallel rows with respect to the vehicle travel path and including a plurality of laterally spaced, vertical slits in the lower portion thereof forming a plurality of narrow strips which extend below the upper portions of the vehicle;
    means for wetting the upper portions of the vehicle; and
    drive means for oscillating said carriage means through an arcuate path about said axis to swing said sheets back and forth relative to the vehicle travel in a direction generally parallel to the vehicle travel path so that said strips scrub the upper portions of the vehicle as it moves along the travel path.

13. An apparatus according to claim 12 wherein said support arms are arranged in a semicircular pattern with respect to said axis and in parallel, spaced relation with respect to the direction of vehicle travel.

* * * * *